United States Patent [19]

Hochstein

[11] 4,409,586
[45] Oct. 11, 1983

[54] TIRE CONDITION MONITOR CONVERTER

[76] Inventor: Peter A. Hochstein, 14020 Fifteen Mile Rd., Sterling Heights, Mich. 48077

[21] Appl. No.: 267,261

[22] Filed: May 26, 1981

[51] Int. Cl.³ .............................................. B60C 23/02
[52] U.S. Cl. .................................... 340/58; 73/146.5; 340/870.31
[58] Field of Search ............................ 340/58, 870.31; 200/61.22, 61.25; 73/146.5

[56] References Cited

U.S. PATENT DOCUMENTS

| | | | |
|---|---|---|---|
| 3,662,335 | 5/1972 | Fritze | 340/58 |
| 3,806,905 | 4/1974 | Strenglein | 340/58 X |
| 3,858,174 | 12/1974 | Harris | 200/61.22 X |
| 4,006,449 | 2/1977 | Sumi | 340/58 |
| 4,074,227 | 2/1978 | Kalmus | 340/58 |
| 4,174,515 | 11/1979 | Marzolf | 340/58 |

*Primary Examiner*—David L. Trafton
*Assistant Examiner*—Joseph Nowicki
*Attorney, Agent, or Firm*—Harold W. Milton, Jr.

[57] ABSTRACT

A tire condition monitor converter including a plurality of wires extending about a tire rim and defining a first coil electrically connected to a first capacitor to define a first LC circuit and a second coil electrically connected to a second capacitor to define a second LC circuit. A mounting ring of electrically insulating material extends about the rim and has grooves therein in which the wires are disposed. A yieldable material is disposed between the ring and the rim for allowing radial expansion and contraction of the ring and rim while maintaining the circumferential length of the wires constant. A connecting block is disposed between the terminal ends of the mounting ring and the wires are connected to the block to place the wires in tension. The block includes circuit means for electrically interconnecting the ends of the respective wires and also supports the capacitors. A pressure switch is disposed in the circuit and is responsive to tire pressure. A diode interconnects the two LC circuits and the second LC circuit is resonant at a frequency which is a harmonic of the first frequency to which the first LC circuit is resonant. Also disclosed is an exciter coil assembly which establishes a magnetic field at a frequency to which the first LC circuit is resonant. The exciter coil assembly includes a core with a winding supported within a shield for limiting E-field propagation.

7 Claims, 7 Drawing Figures

TIRE CONDITION MONITOR CONVERTER

BACKGROUND OF THE INVENTION

1. Field of the Invention

The subject invention relates to a converter used in a system for monitoring the condition of a vehicle wheel mounted tire such as the pressure or temperature within the tire.

2. Description of the Prior Art

For some time there has been interest in monitoring the air pressure in a pneumatic tire. Because an important factor governing the useful service life of a pneumatic tire is correct inflation pressure, there has been significant interest with truck tires because of their relatively high replacement cost. There is now, however, significant interest in monitoring the tire inflation pressure on passenger cars because correct inflation pressure significantly improves fuel economy by decreasing tire rolling resistance.

Many systems have been proposed to continuously monitor tire pressure on a vehicle but none have been widely adopted because of difficulties with either cost, complexity, reliability or a combination of these factors.

The prior systems have either been mechanical or electrical with the mechanical systems having been virtually eliminated from consideration. Electrical systems have included a battery powered wheel monitor radio transmitter or a passive circuit of the energy absorbing type or an induction or transformer type. The battery system is such that the system draws power from the battery only when a fall in pressure or temperature occurs to power the transmitter. These systems have not been widely accepted because they are not fail-safe in that if a malfunction occurs in the system there is no indication. In a fail-safe system, the monitor must be active and self-checking until a fault is sensed, such as the drop of the tire pressure below a predetermined pressure. If a battery were utilized in such a system, it would have to be continually recharged because the system would be providing a signal at all times except when a fault is sensed.

Passive circuits have been used to monitor a tire condition wherein a passive converter circuit is responsive to an energy field, such as a radio frequency or magnetic field, and converts or transponds that signal to an energy field which may be detected or received. Passive circuits which have been utilized to sense tire pressure have not had the desired sensitivity and have inherent coupling problems. Furthermore, coupling to the detector or antenna in such systems is a function of the rotational position of the wheel. The subject invention relates to a passive circuit converter to be disposed within the tire and which overcomes many of the problems associated with the prior art systems.

SUMMARY OF THE INVENTION

A tire condition monitor converter assembly which includes a circular mounting means for engaging a vehicle wheel rim. A plurality of wires extend about the mounting means and terminal means place the wires in tension about the rim and against the mounting means.

PRIOR ART STATEMENT

U.S. Pat. No. 3,723,966 granted Mar. 27, 1973 to Mueller et al discloses a passive circuit-type tire monitor including a passive converter circuit having a pressure switch in the circuit. A transmitter transmits to the passive circuit which, in turn, absorbs some of the transmitted signal by being resonant at the same frequency as that of the transmitted signal. The received signal is actually the transmitted signal energy minus that energy absorbed by the passive circuit which is resonant to the transmitter signal at the same frequency. The problem with such a system is the separation of the relatively large transmitted signal from the relatively small absorbed signal and there must be proper orientation between the transmitter and the passive circuit for the system to work, which is a function of the rotational position of the wheel.

U.S. Pat. No. 2,274,557 granted Feb. 24, 1942 to Morgan et al discloses three circuits with the second resonant to the frequency of the first whereby an indication is provided in the third circuit. Again, the system experiences a problem in a lack of separation between the relatively large signal of the first circuit from the relatively small signal of the second circuit. Although Morgan et al disclose multi-loop coils, there is not shown a practical system for mounting the coils or maintaining the resonant frequency constant in each circuit.

The converter of the subject invention overcomes these problems.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
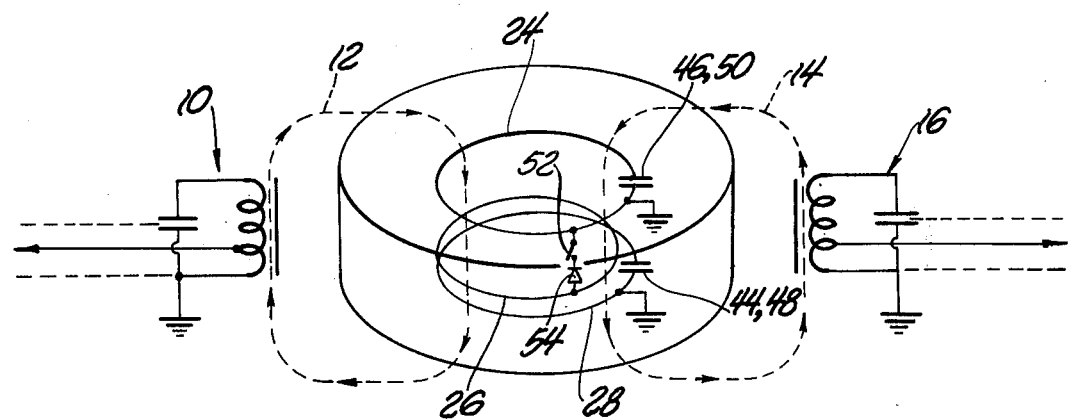
FIG. 1 is a schematic view of a system employing the converter of the subject invention.

The converter assembly of the subject invention may be utilized in a system schematically illustrated in FIG. 1, which is of a type more specifically described and claimed in applicant's co-pending application Ser. No. 267,258 filed concurrently herewith and assigned to the assignee of the subject invention, the description of which is incorporated herein by this reference. In accordance with that system, an exciter coil, generally shown at 10, comprising a coil in parallel with a capacitor establishes a magnetic field 12 at a predetermined frequency. The converter of the subject invention is responsive to the magnetic field 12 and produces a second energy field 14 at a different second frequency which may be monitored or interrogated by a coil and capacitor circuit, generally shown at 16.

Figure 2:
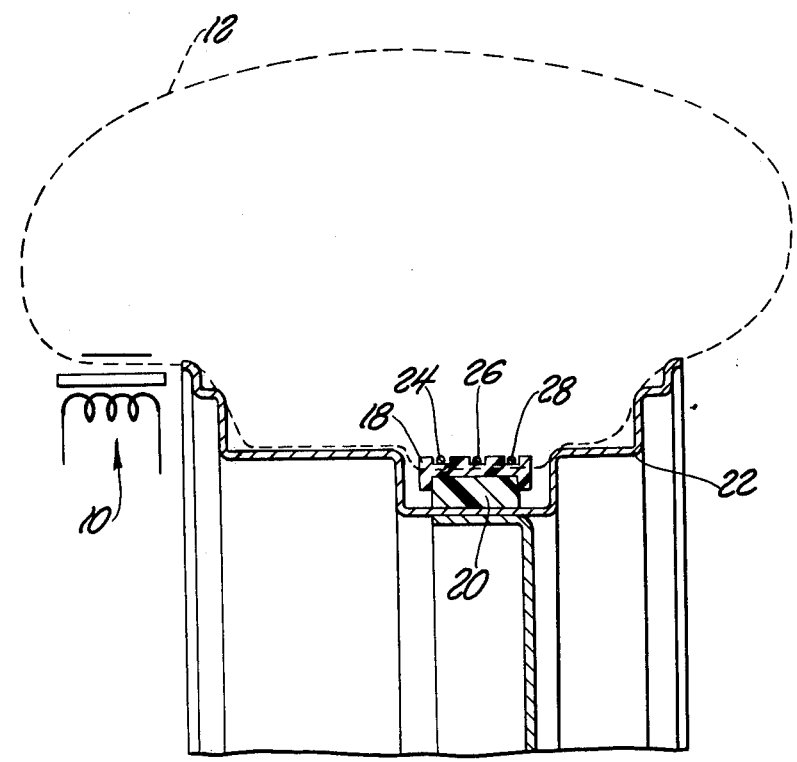
FIG. 2 is a fragmentary, cross-sectional view of the subject assembly mounted upon a wheel rim.

The converter assembly of the subject invention includes a circular mounting means comprising the mounting ring 18 and yieldable material 20 engaging a vehicle wheel rim 22. A plurality of wires 24, 26 and 28 extend about the mounting ring 18 and therefore about the rim 22. Also included is a terminal means defined by the connecting block generally indicated at 30 for placing the wires 24, 26 and 28 in tension about the rim 22 against the mounting ring 18 and the yieldable material 20. The mounting ring 18 is preferably made of a plastic such as an acetal and the yieldable material 20 may take the form of silicone rubber. The yieldable material 20 allows for change in the wheel rim 22 diameter and/or mounting ring 18 diameter while the diameter and/or circumferential length of the wires 24, 26 and 28 remains constant. Thus, the mounting ring 18 is of an electrically insulating material as is the yieldable material 20. The yieldable material 20 may taken the form of a ring or may be segmented in form of a plurality of parts. As shown in FIG. 2, the mounting ring 18 has a circumferentially extending recess in the bottom thereof for receiving the yieldable material 20, the yieldable material 20 filling the recess in the bottom of the ring 18. The mounting ring 18 has a plurality of circumferential grooves in its outer surface in which the wires 24, 26 and 28 are disposed.

Figure 3:
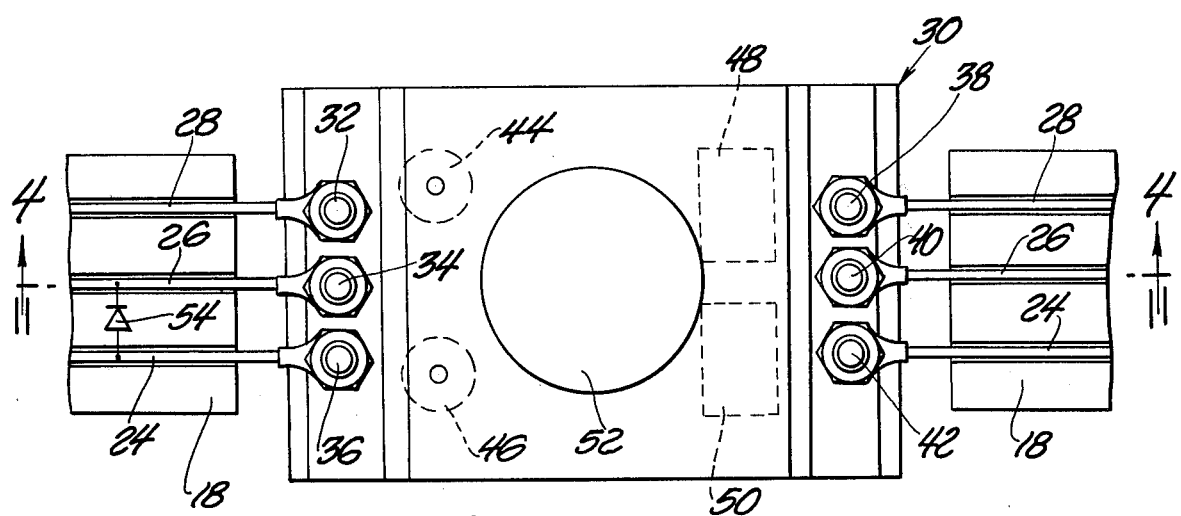
FIG. 3 is a fragmentary plan view of a terminal block associated with the wheel rim of the subject assembly.
Figure 4:
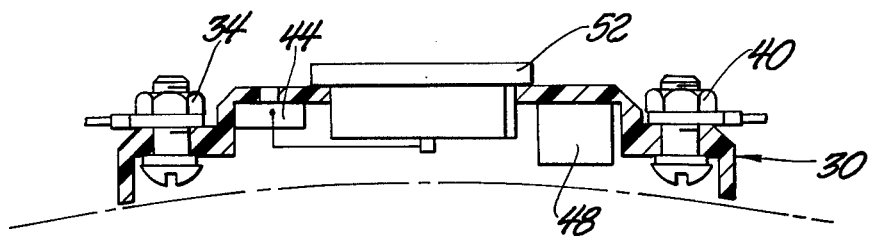
FIG. 4 is a cross-sectional view taken substantially along line 4—4 of FIG. 3.

As illustrated in FIG. 3, the mounting ring 18 has spaced ends and the connecting block 30 is disposed between the ends of the mounting ring 18. The connecting block 30 is made of an electrically insulating material such as plastic. The yieldable material 20 and the connecting block 30 would be glued to the vehicle rim 30 as by a silicone rubber adhesive.

The block 30 includes connectors 32, 34, 36, 38, 40 and 42 for connection to opposite ends of the wires 24, 26 and 28. The block 30 also includes circuit means for electrically interconnecting the ends of the respective wires 24, 26 and 28. The electrical circuit means includes capacitor means comprising the capacitors 44, 46, 48 and 50 which are supported by the block 30. The capacitors may be glued to the block 30.

Two of the wires 26 and 28 are electrically connected through the block 30 to define a first coil. Specifically, the first coil would have in effect two loops by electrically connecting terminal 32 through capacitors 44 and 48 to terminal 40 and then connecting terminal 34 to terminal 38 thereby defining a coil with the two loops defined by the wires 28 and 26. This defines a first LC circuit which is a passive circuit. A second LC circuit is defined by the wire 24 as the terminal 36 is connected through capacitors 46 and 50 to terminal 42.

A switch 52 is supported by the block 30 and connected to the electrical circuit means supported thereby and interconnects the two LC circuits electrically. The switch 52 senses a predetermined tire condition such as pressure or temperature. The switch may also be glued to the block 30.

A harmonic multiplier in the form of a diode 54 interconnects the first and second coils by interconnecting the wires 24 and 26 thereof so that the first LC circuit including the two wires 26 and 28 is resonant to a first frequency established by the magnetic field 12 and the second LC circuit defined by the single loop wire 24 is resonant to a second but different frequency.

The pressure switch 52 opens and breaks the connection between the first and second LC circuits when the pressure within the tire and surrounding the switch falls below a predetermined pressure. The pressure switch 52 closes when the pressure is raised to the predetermined and desired level. The pressure switch 52 is in series with the diode 54 between the two LC circuits to couple the two LC circuits.

Although only one capacitor is illustrated schematically in FIG. 1, as pointed out above, two capacitors are utilized in each LC circuit. The capacitor 48 is of a fixed value whereas the capacitor 44 is a variable or tuning capacitor of a lesser value. The same is true in regard to capacitors 50 and 46 wherein capacitor 50 is of a fixed value and capacitor 46 is variable or tuneable whereby the capacitors 44 and 46 may be adjusted to fine tune the LC circuits.

It will be appreciated that the circumferential length of each coil must remain constant for the coils of the LC circuits to remain resonant at the desired frequencies. Accordingly, the yieldable material 20 allows the rim diameter to change while maintaining the circumferential length of the respective coils constant.

Preferably, the converter assembly propagates an E-field from the second LC circuit. This is accomplished by grounding the first LC circuit to the vehicle rim without so grounding the second LC circuit. The coil of the second LC circuit functions as a radiator or antenna and the steel wheel functions as a grounded counterpoise.

Figure 5:
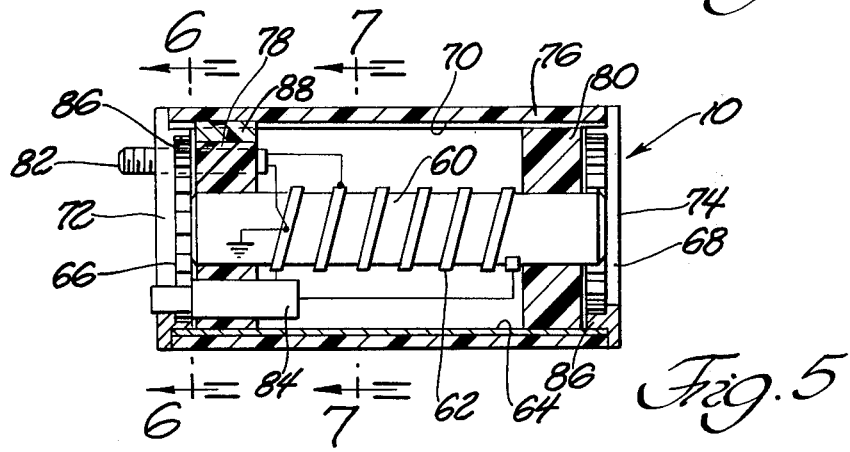
FIG. 5 is a cross-sectional view of an exciter coil assembly which may be utilized to establish an exciting signal which is sensed by the converter of the subject assembly.
Figure 6:
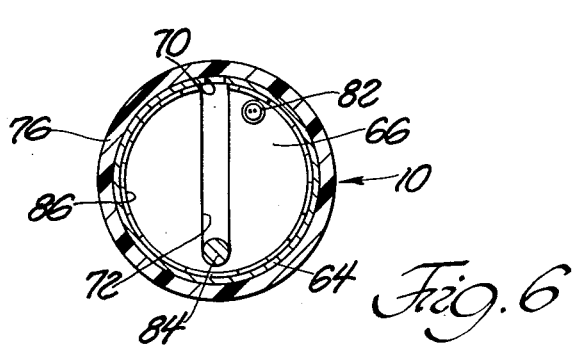
FIG. 6 is a cross-sectional view taken substantially along line 6—6 of FIG. 5.
Figure 7:
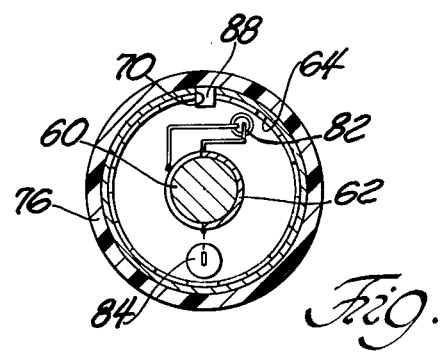
FIG. 7 is a cross-sectional view taken substantially along line 7—7 of FIG. 5.

FIGS. 5 through 7 disclose an exciter coil assembly 10 which may be employed to establish a signal having the frequency to which the first LC circuit is resonant. The exciter coil assembly 10 is particularly suited for use in a system wherein the second LC circuit defined by the loop or wire 24 produces an E-field picked up by an interrogator in much the same fashion as a radio transmission to an antenna. Such a system is described and claimed in the aforementioned U.S. patent application Ser. No. 267,258.

The exciter assembly 10 would be mounted adjacent the front vehicle wheel on the brake mechanism which moves with the wheel during steering and on the stationary structure adjacent the rear wheel.

The exciter assembly 10 includes a ferrite core 60 having a winding of copper tape or ribbon 62 helically disposed thereabout.

A shield is disposed about the core 60 and winding 62 for limiting the propagation of E-field radiation. The shield includes a cylindrical sleeve 64 which is preferably made of brass. The sleeve 64 extends between opposite ends which are closed by end caps 66 and 68. The end caps 66 and 68 are also preferably made of brass. The sleeve 64 has a longitudinal slot 70 therein extending between the ends of the sleeve 64. In other words, the sleeve 64 is not continuous in a circle, as it has a slot 70 extending completely therethrough from end to end.

The end caps 66 and 68 each have an end slot 72 and 74 respectively extending from the adjacent end of the longitudinal slot 70. The end slots 72 and 74 extend diametrically across the end caps 66 and 68 and terminate in spaced relationship to the opposite periphery of the respective end caps. In other words, the slots 72 and 74 do not extend completely across the respective end caps.

The sleeve 74 is disposed in a circle in radially spaced relationship to the coil 62. A housing 76 engages and surrounds the sleeve 64 and is preferably made of a plastic. Circular washer-like spacers 78 and 80 surround and support opposite ends of the core 60 within the sleeve 64. An input connector 82 extends through the end cap 66 and the spacer 78 and is electrically connected to the coil 62.

A capacitor is supported by the spacer 78 and is electrically connected to the coil 62. The spacers 78 and 80 are preferably made of a plastic such as acetal. The capacitor 84 is accessible through the end cap 66 for tuning the exciter assembly.

The caps 66 and 68 are separate members from the sleeve and have flanges which abut the ends of the plastic housing 76. The caps also include projections 86 which may take the form of separate fingers which extend axially of the sleeve 64 to engage the interior of the sleeve 64 for electrical contact therewith.

The components may be glued together. A spacer 88 is disposed in the slot 70 and rests in a groove in the spacer 78 for aligning the components during assembly.

As alluded to above, exciter assembly 10 is particularly suitable for a system where the interrogation or monitoring is by way of an E-field established by the converter disposed within the vehicle tire. The shield in the exciter assembly 10 limits the propagation of E-field radiation which could interfere with the monitoring of the E-field generated by the converter within the tire yet establishes an H-field (i.e., magnetic field) which is utilized by the converter within the tire and converted to the E-field propagation. The continuous slot established by the slots 70, 72 and 74 prevents the shield acting as a shorted secondary of a transformer.

At 10 MHz, a practical radiator antenna coil would consist of a Q-2 ferrite core 60 approximately 0.5" in diameter by 3.0" long with six to eight turns of 0.10" wide copper tape 62 tapped and fed at one turn. In practice, one such coil is mounted in proximity to each wheel rim (from 1" to 4" away) so as to induce the 10 MHz H-field into the converter. To minimize electromagnetic interference due to E-field propagation, each exciter coil is shielded with a special grounded electrostatic shield which surrounds the core.

When r.f. current is induced in the first resonant LC circuit of the passive, wheel mounted converter in response to the fundamental frequency established by the exciter assembly 10, harmonic energy is created by diode 54 whereby the second resonant LC circuit of the converter is excited. The excitation of the second tuned LC circuit causes an E-field to exist at the harmonic multiple of the fundamental frequency. Reception of second harmonic energy by the antenna is optimized by once again using a high Q ferrite loaded coil and resonating capcitor, sharply tuned to the desired harmonic. In order to preserve the high loaded Q and to optimize energy transfer, the ferrite antenna coil is properly tapped or impedance matched to the low impedance transmission line which conducts the received signal to an appropriate tuned receiver. It has been emperically determined that in order to effectuate maximum power transfer to and from the harmonic generator or converter a high Q in both $f_o$ and $nf_o$ circuits is critical; and careful impedance matching the harmonic multiplier diode 54 to both coils of the LC circuits accomplishes this by optimum connections of the diode 54 along the respective coils 24 and 26–28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A tire condition monitor converter assembly comprising; a circular mounting means for engaging a vehicle wheel rim, a plurality of coils of wire extending about said mounting means, and terminl means for deposition on the wheel rim with said mounting means and including a first capacitor connected to a first number of said coils of said wire about said mounting means to define a first LC circuit and a second capacitor connected to a second number of said coils of said wire about said mounting means to define a second LC circuit, said first number of coils being different than said second number of coils, a harmonic multiplier supported by said mounting means and interconnecting said one of said coils of said first LC circuit with one of said coils of said second LC circuit at a position about the circumference of said mounting means so that said first LC circuit is resonant to a first frequency and said second LC circuit is resonant to a different second frequency, a switch supported by said terminal means and connected to said LC circuits for actuating upon sensing a predetermined tire condition.

2. An assembly as set forth in claim 1 wherein said mounting means includes a yieldable material between said wires and said rim.

3. An assembly as set forth in claim 1 wherein said mounting means has a plurality of circumferential grooves for receiving said wires.

4. An assembly as set forth in claim 1 wherein said mounting means has spaced ends and said terminal means includes a connecting block of electrically insulating material for disposition between said ends of said mounting means, said block including connectors for connection to the opposite ends of said wires.

5. An assembly as set forth in claim 1 wherein said multiplier comprises a diode.

6. An assembly as set forth in claim 1 wherein said switch comprises a pressure switch which opens and breaks the connection between said first and second LC circuits when the pressure surrounding said switch falls below a predetermined pressure.

7. An assembly as set forth in claim 6 wherein said first and second capacitors are variable capacitors for tuning said first and second LC circuits.

* * * * *